US009856350B2

(12) United States Patent
Saillard et al.

(10) Patent No.: US 9,856,350 B2

(45) Date of Patent: Jan. 2, 2018

(54) COPOLYAMIDE, COMPOSITION COMPRISING SUCH A COPOLYAMIDE AND THEIR USES

(75) Inventors: Benjamin Saillard, Bernay (FR); Philippe Blondel, Bernay (FR); Claire Isabelle Michalowicz, Evreux (FR)

(73) Assignee: ARKEMA FRANCE, Colombes (FR)

( * ) Notice: Subject to any disclaimer, the term of this patent is extended or adjusted under 35 U.S.C. 154(b) by 121 days.

(21) Appl. No.: 13/000,100

(22) PCT Filed: Jun. 22, 2009

(86) PCT No.: PCT/FR2009/051185

§ 371 (c)(1), (2), (4) Date: Mar. 28, 2011

(87) PCT Pub. No.: WO2009/153534

PCT Pub. Date: Dec. 23, 2009

(65) Prior Publication Data

US 2011/0171408 A1 Jul. 14, 2011

(30) Foreign Application Priority Data

Jun. 20, 2008 (FR) ..................................... 08 54090

(51) Int. Cl.

| | |
|---|---|
| ***B32B 1/00*** | (2006.01) |
| ***B32B 1/08*** | (2006.01) |
| ***C08G 69/14*** | (2006.01) |
| ***C08G 69/36*** | (2006.01) |
| ***C08L 77/08*** | (2006.01) |
| ***C08G 69/26*** | (2006.01) |
| ***C08J 5/18*** | (2006.01) |
| ***C08L 77/06*** | (2006.01) |
| *C08L 77/00* | (2006.01) |
| *C08L 77/12* | (2006.01) |

(52) U.S. Cl.

CPC ........... *C08G 69/26* (2013.01); *C08G 69/265* (2013.01); *C08G 69/36* (2013.01); *C08J 5/18* (2013.01); *C08L 77/06* (2013.01); *C08J 2377/00* (2013.01); *C08L 77/00* (2013.01); *C08L 77/12* (2013.01); *Y10T 428/139* (2015.01); *Y10T 428/1352* (2015.01)

(58) Field of Classification Search

CPC .......... C08L 77/02; C08L 77/04; C08L 77/00; C08L 77/06; C08L 77/08; C08L 77/10; C08L 77/12; C08J 2377/00; C08J 2377/02; C08J 2377/04; C08J 2377/06; C08J 2377/08; C08J 2377/10; C08J 2377/12; C08G 69/00; C08G 69/02; C08G 69/04; C08G 69/06; C08G 69/08; C08G 69/10; C08G 69/12; C08G 69/14; C08G 69/16; C08G 69/18; C08G 69/20; C08G 69/22; C08G 69/24; C08G 69/26; C08G 69/265; C08G 69/28; C08G 69/30; C08G 69/34; C08G 69/42; C08G 69/44

USPC ....... 428/35.7, 36.9, 34.1–36.92, 395, 423.5, 428/458, 459, 474.5, 476.6, 478.2; 528/310, 335, 324, 329.1, 331, 332, 336, 528/338, 339, 340, 346, 347, 325; 525/432, 607; 524/538, 606, 607

See application file for complete search history.

(56) References Cited

U.S. PATENT DOCUMENTS

| | | | | |
|---|---|---|---|---|
| 2,374,576 | A * | 4/1945 | Brubaker | 524/291 |
| 2,733,230 | A | 1/1956 | Ufer | |
| 3,027,356 | A * | 3/1962 | Von Schickh et al. | 528/313 |
| 4,386,197 | A * | 5/1983 | Panoch et al. | 528/324 |
| 4,673,723 | A * | 6/1987 | Cuzin | 528/113 |
| 4,731,421 | A * | 3/1988 | Hoppe et al. | 525/432 |
| 4,847,356 | A * | 7/1989 | Hoppe | C08G 69/36 525/432 |
| 5,254,466 | A | 10/1993 | Picataggio et al. | |

(Continued)

FOREIGN PATENT DOCUMENTS

| | | | |
|---|---|---|---|
| CN | 1635013 | A * | 7/2005 |
| EP | 1 369 447 | A1 | 12/2003 |

(Continued)

OTHER PUBLICATIONS

"Rislan PA 11: Created From a Renewable Source", p. 1, Dated Oct. 30, 2007 from internet archive Wayback Machine http://wayback.archive.org/web/20070701000000*/http://www.arkema-inc.com/literature/pdf/738.pdf, Arkema Group.*

Shahidi, Fereidoon "Baileys Industrial Oil and Fat Products" 6th edition, vol. 6, p. 224-225.*

Chapter 1 of the Polymer & Fillers blog, available online at http://polymer-fillerblogspot.com/2008/08/chapter-l-introduction-fillers.html on Aug. 3, 2008.*

International Search Report of PCT/FR2009/051185 (dated Oct. 29, 2009).

(Continued)

*Primary Examiner* — Lee E Sanderson

(74) *Attorney, Agent, or Firm* — Millen, White, Zelano & Branigan, P.C.

(57) ABSTRACT

The present invention relates to a copolyamide comprising at least two units and corresponding to the following general formula:

A/(diamine).(Cw diacid), in which:

the diamine is a cycloaliphatic diamine, w represents the number of carbon atoms of the diacid, A is chosen from a unit obtained from an amino acid or from a lactam and a unit corresponding to the formula (Cx diamine).(Cy diacid), with x representing the number of carbon atoms of the diamine and y representing the number of carbon atoms of the diacid, and in which at least one of the monomers chosen from A and the Cw diacid is obtained, in all or part, from renewable starting materials according to Standard ASTM D6866.

The invention also relates to a composition comprising this copolyamide and to the use of this copolyamide and of such a composition.

8 Claims, 1 Drawing Sheet

(56) References Cited

U.S. PATENT DOCUMENTS

| | | | | |
|---|---|---|---|---|
| 5,434,307 | A | 7/1995 | Nwaonicha et al. | |
| 5,498,733 | A * | 3/1996 | Ayorinde et al. | 554/132 |
| 6,004,784 | A | 12/1999 | Mobley et al. | |
| 6,066,480 | A * | 5/2000 | Mobley et al. | 435/142 |
| 6,255,378 | B1 * | 7/2001 | Fujimoto | C08K 3/34<br>524/445 |
| 6,916,517 | B2 | 7/2005 | Montanari | |
| 2001/0031805 | A1 * | 10/2001 | Buhler | C08L 77/00<br>524/99 |
| 2003/0235666 | A1 * | 12/2003 | Buhler | 428/35.7 |
| 2005/0272908 | A1 * | 12/2005 | Linemann et al. | 528/310 |
| 2006/0238700 | A1 * | 10/2006 | Del Vecchio | G02C 5/00<br>351/103 |
| 2011/0040023 | A1 * | 2/2011 | Buhler et al. | 524/538 |

FOREIGN PATENT DOCUMENTS

| | | | |
|---|---|---|---|
| EP | 1 595 907 | A1 | 11/2005 |
| EP | 1227132 | B1 | 6/2010 |
| EP | 2203521 | B1 * | 6/2011 |
| FR | 2575756 | B1 | 6/1990 |
| GB | 1193487 | A | 6/1970 |
| WO | WO 91/06660 | A1 | 5/1991 |
| WO | WO 03091374 | A1 * | 11/2003 |

OTHER PUBLICATIONS

K. S. Kim et al., "Copolyamides Derived from Brassylic Acid", Journal of Applied Polymer Science, vol. 23 (1979) pp. 439-444.

Office Action in corresponding EP application No. 09766096 dated Jun. 8, 2016.

* cited by examiner

| Examples | A11 %mol | BACM %mol | PACM20 %mol | PACM50 %mol | DC12 %mol | DC10 %mol | DA10 %mol | HMDA %mol | MXDA %mol | Enthalpy of fusion (J/g) | Tg | %(w) renewable C (ASTM D6866) |
|---|---|---|---|---|---|---|---|---|---|---|---|---|
| A | 23,0 | 38,5 | - | - | - | 38,5 | - | - | | 0 | 132 | 53 |
| B | 82,0 | 9,0 | - | - | - | 9,0 | - | - | | 0 | 65 | 80 |
| C | 82,0 | 4,5 | 4,5 | - | - | 9,0 | - | - | | 6,7 | 60 | 81 |
| D | 84,8 | 3,8 | 3,8 | - | - | 7,6 | - | - | | 20,1 | 56 | 84 |
| E | 92,4 | 3,8 | - | - | - | 3,8 | - | - | | 35,8 | 50 | 91 |
| F | - | 50,0 | - | - | - | 50,0 | - | - | | 0 | 162 | 40 |
| G | - | 50,0 | - | - | 50,0 | - | - | - | | 0 | 155 | 0 |
| H | 50,0 | 25,0 | - | - | - | 25,0 | - | - | | 0 | 114 | 58 |
| I | 20,2 | - | 39,9 | - | - | 39,9 | - | - | | 0 | 119 | 54 |
| J | - | 31,3 | - | - | - | 50,0 | 18,7 | - | | 0 | 106 | 59 |
| K | - | 19,9 | - | - | - | 50,0 | - | 30,1 | | 0 | 84 | 51 |
| L | - | 38,5 | - | - | - | 50,0 | 11,5 | - | | 0 | 123 | 52 |
| M | 20,0 | - | - | 40,0 | - | 40,0 | - | - | | 33,6 | 121 | 54 |
| N | 82,0 | 4,5 | - | 4,5 | - | 9,0 | - | - | | 23,5 | 68 | 81 |
| O | 82,0 | 4,5 | 4,5 | - | - | 9,0 | - | - | | 6,7 | 62 | 81 |
| P | - | 38,5 | - | - | - | 50,0 | - | - | 11,5 | 0 | 134 | 43 |
| Q | - | 31,3 | - | - | - | 50,0 | - | - | 18,7 | 0 | 118 | 45 |
| R | - | 20,0 | - | - | - | 50,0 | - | - | 30,0 | 0 | 90 | 48 |
| S | - | 11,0 | - | - | - | 50,0 | - | - | 39,0 | 0 | 77 | 51 |

COPOLYAMIDE, COMPOSITION COMPRISING SUCH A COPOLYAMIDE AND THEIR USES

The present invention relates to a copolyamide and to its use, in particular in the manufacture of various items, such as staples, for example spectacle frames, spectacle lenses, electrical, electronic or motor vehicle fittings, surgical materials, packaging or sports equipment.

The invention also relates to a composition comprising such a copolyamide and to the use of this composition, in particular in the manufacture of all or part of the items which have just been listed above.

Transparent amorphous polyamides obtained by polycondensation of diamines and of diacids are currently known. Such polyamides are particularly advantageous as they exhibit numerous mechanical properties, such as impact strength, tensile strength and/or compressive strength, high resistance to external attack (such as heat, chemicals, UV radiation, and the like), as well as transparency.

Consequently, the appearance has been seen of items based on polyamides, such as, for example, spectacle frames, various cases, motor vehicle fittings, surgical materials, packaging or sports equipment.

Transparent amorphous polyamides suitable for the manufacture of items of this type have been described in particular in the documents EP 1 595 907 and US 2005/0272908 on behalf of the Applicant. These polyamides are obtained by polycondensation of at least one cycloaliphatic diamine and at least 50 mol % of tetradecanedioic acid, it being possible for the other additional dicarboxylic acid or acids to be chosen from aliphatic, aromatic and cycloaliphatic dicarboxylic acids.

These polyamides exhibit not only all the properties set out above but also a relatively high glass transition temperature Tg typically of the order of 130° C. to 160° C. approximately.

However, the environmental concerns of recent years militate in favour of the development of materials which meet as much as possible the concerns for sustainable development by limiting in particular the provisioning of starting materials resulting from the oil industry in their manufacture.

The aim of the present invention is thus to provide a polyamide which has at least some of the mechanical properties set out above while being formed from a renewable or bioresourced starting material according to Standard ASTM D6866.

According to the invention, the polyamide is more specifically a copolyamide.

Generally, copolyamides comprise at least two distinct repeat units, these distinct units being formed from the two corresponding monomers or comonomers. Copolyamides are thus prepared from two or more monomers or comonomers chosen from an amino acid, a lactam and/or a dicarboxylic acid and a diamine.

The copolyamide according to the invention comprises at least two units (respectively represented "A" and "(diamine).(Cw diacid)") and corresponds to (that is to say, comprises at least) the following general formula:

A/(diamine).(Cw diacid), in which:

the diamine is a cycloaliphatic diamine, w represents the number of carbon atoms of the diacid and is preferably between 4 and 36, and A is chosen from a unit obtained from an amino acid or from a lactam and a unit corresponding to the formula (Cx diamine).(Cy diacid), with x representing the number of carbon atoms of the diamine and y representing the number of carbon atoms of the diacid, x and y each being preferably between 4 and 36.

According to the invention, at least one of the (co)monomers chosen from A and the Cw diacid is obtained, in all or part, from renewable or bioresourced starting materials according to Standard ASTM D6866 in order for the content, expressed as percentage, of renewable organic carbon (also known as bioresourced carbon or "contemporary" carbon) in the copolyamide, denoted % $C_{renew.org}$, to be strictly greater than 0, the content % $C_{renew.org}$ corresponding to the following equation (I):

$$\% C_{renew.org} = \frac{\sum_i Fi \times Ci + \sum_k Fk \times Ck'}{\left(\sum_j Fj \times Cj + \sum_i Fi \times Ci + \sum_k Fk \times Ck\right)} \times 100 \tag{I}$$

with i=monomer(s) resulting from 100% renewable starting materials, within the meaning of Standard ASTM D6866 j=monomer(s) resulting from 100% fossil starting materials, within the meaning of Standard ASTM D6866 k=monomer(s) resulting in part from renewable starting materials, within the meaning of Standard ASTM D6866

Fi, Fj, Fk=respective molar fraction(s) of the monomers i, j and k in the copolyamide Ci, Cj, Ck=respective number of carbon atoms of the monomers i, j and k in the copolyamide, Ck'=number of atoms of renewable organic carbon, within the meaning of Standard ASTM D6866, in the monomer(s) k.

The nature (renewable or fossil), that is to say the provenance of each of the monomers i, j and k, is determined according to one of the methods of Standard ASTM D6866.

In other words, in the copolyamides according to the invention, at least one of the (co)monomers which are:

either the amino acid and the Cw diacid, or the lactam and the Cw diacid, or the Cx diamine and also the Cy and Cw diacids, is obtained, in all or part, from a renewable starting material according to Standard ASTM D6866.

The (co)monomer A, in all its alternative forms (lactam, amino acid or (Cx diamine).(Cy diacid)), the cycloaliphatic diamine and the Cw diacid are monomers i, j and k within the meaning of equation (I).

A renewable or bioresourced starting material is an animal or vegetable natural resource, the stock of which can be built up again over a short period on the human scale. In particular, it is necessary for this stock to be able to be renewed as quickly as it is consumed.

Unlike the materials resulting from fossil materials, renewable or bioresourced starting materials comprise $^{14}C$. All the carbon samples drawn from living organisms (animals or plants) are in fact a mixture of 3 isotopes: $^{12}C$ (representing approximately 98.892%), $^{13}C$ (approximately 1.108%) and $^{14}C$ (traces: $1.2\times10^{-10}$%). The $^{14}C/^{12}C$ ratio of living tissues is identical to that of the atmosphere. In the environment, $^{14}C$ exists in two predominant forms: in the inorganic form, that is to say of carbon dioxide gas ($CO_2$), and in the organic form, that is to say of carbon incorporated in organic molecules.

In a living organism, the $^{14}C/^{12}C$ ratio is kept constant by the metabolism, as the carbon is continuously exchanged with the environment. As the proportion of $^{14}C$ is constant in the atmosphere, it is the same in the organism, while it is living, since it absorbs this $^{14}C$ like it absorbs $^{12}C$. The mean ratio of $^{14}C/^{12}C$ is equal to $1.2\times10^{-12}$.

$^{12}C$ is stable, that is to say that the number of $^{12}C$ atoms in a given sample is constant over time. $^{14}C$ is for its part radioactive (each gram of carbon of a living being contains sufficient $^{14}C$ isotopes to give 13.6 disintegrations per minute) and the number of such atoms in a sample decreases over time (t) according to the law:

$$n=no\exp(-\underline{a}t),$$

in which:

no is the number of $^{14}C$ atoms at the start (at the death of the creature, animal or plant), n is the number of $^{14}C$ atoms remaining after time t, $\underline{a}$ is the disintegration constant (or radioactive constant); it is related to the half life.

The half life (or half life period) is the time at the end of which any number of radioactive nuclei or unstable particles of a given entity is reduced by half by disintegration; the half life $T_{1/2}$ is related to the disintegration constant $\underline{a}$ by the formula $\underline{a}T_{1/2}=\ln 2$. The half life of $^{14}C$ is 5730 years.

In view of the half life ($T_{1/2}$) of $^{14}C$, the $^{14}C$ content is substantially constant from the extraction of the renewable starting materials up to the manufacture of the copolyamides according to the invention and even up to the end of their use.

The copolyamide according to the invention is thus composed at least partially of organic carbon resulting from renewable or bioresourced starting materials, which could be certified by determination of the $^{14}C$ content according to one of the methods described in Standard ASTM D6866.

This Standard ASTM D6866 comprises three methods for measuring organic carbon resulting from renewable starting materials, referred to as biobased carbon. The proportions indicated for the copolyamides of the invention are preferably measured according to the method by mass spectrometry or the method by liquid scintillation spectrometry which are described in this standard.

Consequently, the presence of $^{14}C$ in a material, whatever the amount thereof, gives an indication with regard to the origin of its constituent molecules, namely that they originate from renewable or bioresourced starting materials and not from fossil materials. The measurements carried out by the methods described in Standard ASTM D6866 thus makes it possible to distinguish the (co)monomers or starting materials resulting from renewable materials from the (co)monomers or starting materials resulting from fossil materials. These measurements have a test role.

Thus, by the deliberate choice of at least one (co)monomer or starting material which is obtained in part from a renewable starting material within the meaning of Standard ASTM D6866, copolyamides are obtained which exhibit mechanical properties for the most part comparable to those of the polyamides of the prior art, such as those described above, but which in addition make it possible to limit the use of fossil resources in order to meet one of the requirements of the sustainable development policy mentioned above.

For example, this or these (co)monomer(s) can result from renewable resources, such as vegetable oils or natural polysaccharides, such as starch or cellulose, it being possible for the starch to be extracted, for example, from maize or potato. This or these (co)monomer(s) or starting material(s) can in particular originate from various conversion processes, in particular conventional chemical processes, but also from processes for conversion by the enzymatic route or by biofermentation.

In a specific version, the % $C_{renew.org}$ content of the copolyamide according to the invention is greater than or equal to 20%, advantageously greater than or equal to 50%, preferably greater than or equal to 52% and more preferably greater than or equal to 54%.

When the copolyamide according to the invention exhibits a content % $C_{renew.org}$ of greater than or equal to 50%, it meets the criteria for obtaining the "Biomass Pla" certification of the JBPA, a certification which is also based on Standard ASTM D6866. The copolyamide according to the invention can in addition validly carry the "Biomass-based" label of the JORA.

The invention also relates to a composition, the said composition comprising at least one copolyamide as described above.

The invention also relates to the use of such a copolyamide and to the use of a composition comprising at least one such copolyamide to constitute a monolayer structure or at least one layer of a multilayer structure.

In an advantageous version of the invention, the molar content in A is between 20 and 82%, the molar content of cycloaliphatic diamine being between 9 and 40% and the molar content of Cw diacid also being between 9 and 40%.

The choice of such molar contents makes it possible to obtain, in the majority of cases, a transparent copolyamide, the transparency being characterized by an enthalpy of fusion of the copolyamide with a value of between 0 and 12 J/g.

In a preferred version of the invention, the molar content of A is between 22 and 64%, the contents of cycloaliphatic diamine and of Cw diacid each being between 18 and 39%.

It is specified that the expression "between" used in all the preceding paragraphs but also in the continuation of the present description should be understood as including each of the limits mentioned.

According to a first aspect of the invention, the copolyamides comprise at least two units which correspond to the formula A/(diamine).(Cw diacid).

In the formula A/(diamine).(Cw diacid) of the copolyamide according to the invention, the (diamine) denotes a cycloaliphatic diamine.

Among cycloaliphatic diamines, those comprising two rings are preferred. They correspond in particular to the following general formula:

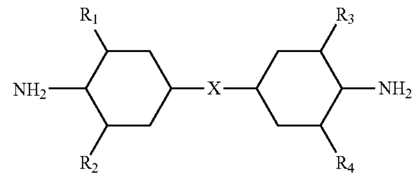

in which $R_1$ to $R_4$ represent identical or different groups chosen from a hydrogen atom or alkyl groups of 1 to 6 carbon atoms and X represents either a single bond or a divalent group composed:

of a linear or branched aliphatic chain comprising from 1 to 10 carbon atoms, of a cycloaliphatic group of 6 to 12 carbon atoms, of a linear or branched aliphatic chain of 1 to 10 carbon atoms substituted by cycloaliphatic groups of 6 to 8 carbon atoms of a group of 8 to 12 carbon atoms composed of a linear or branched dialkyl with a cyclohexyl or benzyl group.

More preferably, the cycloaliphatic diamine of the copolyamide according to the invention is chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl) methane (BMACM or MACM), p-bis(aminocyclohexyl) methane (PACM) and isopropylidenedi(cyclohexylamine) (PACP).

More preferably still, and with a view to obtaining a transparent copolyamide, the cycloaliphatic diamine is chosen from bis(3-methyl-4-aminocyclohexyl)methane (BMACM or MACM), in particular that sold by BASF under the name Laromin® C260, and p-bis(aminocyclohexyl)methane (PACM), with the exclusion of PACM which, when the latter is formed of a mixture of two or more stereoisomers chosen from cis/cis, cis/trans and trans/trans PACM, comprises more than 40% by weight of the trans/trans stereoisomer. PACM comprising from 48 to 50% by weight of the trans/trans stereoisomer, such as PACM48, sold by BASF under the name Dicycane®, or PACM50, is excluded in particular. In contrast, just like BMACM, PACM20 comprising of the order of 20% by weight of the trans/trans stereoisomer, in particular that sold by Air Products under the name Amicure®, is more particularly preferred.

Likewise, in the formula A/(diamine).(Cw diacid), the (Cw diacid) denotes an aliphatic diacid of formula HOOC—$(CH_2)_{w-2}$—COOH in which w indicates the total number of carbon atoms present in the diacid, w being, of course, an integer strictly greater than 2.

The number of carbon atoms w of the diacid of the (diamine).(Cw diacid) unit of the copolyamide according to the invention is preferably an integer between 4 and 36.

Preferably, the Cw diacid is obtained from a renewable starting material according to Standard ASTM D6866 and is chosen from succinic acid (w=4), adipic acid (w=6), heptanedioic acid (w=7), azelaic acid (w=9), sebacic acid (w=10), undecanedioic acid (w=11), dodecanedioic acid (w=12), brassylic acid (w=13), tetradecanedioic acid (w=14), hexadecanedioic acid (w=16), octadecanedioic acid (w=18), octadecenedioic acid (w=18), eicosanedioic acid (w=20), docosanedioic acid (w=22) and the dimer fatty acids comprising 36 carbons.

The dimer fatty acids mentioned above but also in the continuation of the present description for the Cy and Cu diacids are dimerized fatty acids obtained by oligomerization or polymerization of unsaturated monobasic fatty acids comprising a long hydrocarbon chain (such as linoleic acid and oleic acid), as described in particular in the document EP 0 471 566.

The molar proportions of cycloaliphatic diamine and of (Cw diacid) are preferably stoichiometric.

According to a first alternative form of the invention, the (co)monomer or unit A in the general formula A/(diamine).(Cw diacid) is obtained from an amino acid, this amino acid preferably being obtained from a renewable starting material, still according to Standard ASTM D6866.

More preferably, the amino acid is chosen from 9-aminononanoic acid, 10-aminodecanoic acid, 12-aminododecanoic acid and 11-aminoundecanoic acid and its derivatives, in particular N-heptyl-11-aminoundecanoic acid.

In place of one amino acid, it might also be possible to envisage a mixture of two, three or more amino acids. However, the copolyamides formed would then comprise three, four or more units respectively. It is specified that the specific case of a copolyamide comprising three distinct units is described below, in particular in the second aspect of the invention.

The comonomer or (diamine).(Cw diacid) unit in the formula A/(diamine).(Cw diacid) can be composed of any combination of cycloaliphatic diamine and of diacid which it is possible to envisage and in particular of any combination of the cycloaliphatic diamines and Cw diacids which have been listed above.

Thus, symbolizing BMACM by the letter B and the Cw diacid comprising w carbon atoms by the number w, it is possible in particular to envisage the use of the following comonomers: B.4, B.6, B.9, B.7, B.10, B.11, B.12, B.13, B.14, B.16, B.18, B.20, B.22 and B.36, if BMACM is regarded as cycloaliphatic diamine.

Among the combinations which can be envisaged, the unit resulting from 11-aminoundecanoic acid being symbolized by the number 11 and the diamine PACM being symbolized by P, the following copolyamides are of particularly pronounced interest: they are the copolyamides corresponding to one of the formulae chosen from 11/B.10, 11/P.10, 11/B.12, 12/B.12, 11/P.12, 12/P.12, 11/B.14, 11/P.14, 11/B.18 and 11/P.18, preferably 11/B.10 and 11/P.10.

According to a second alternative form of the invention, the (co)monomer or unit A in the general formula A/(diamine).(Cw diacid) is a unit corresponding to the formula (Cx diamine).(Cy diacid), x indicating the number of carbon atoms present in the diamine and y indicating the number of carbon atoms present in the diacid, respectively.

The Cx diamine can be an aliphatic, cycloaliphatic or arylaromatic diamine.

Likewise, the Cy diacid can be an aliphatic, cycloaliphatic or aromatic diacid.

Very clearly, the specific cases for which the (Cx diamine).(Cy diacid) and (Ct diamine).(Cw diacid) comonomers or units are strictly identical, which might arise in the case of the Cx diamine being a cycloaliphatic diamine, are excluded.

The numbers x and y are very clearly integers, x being strictly greater than 0 and y being strictly greater than 2. x and y are preferably each between 4 and 36.

Advantageously, one at least of the (co)monomers from the Cx diamine and the Cy diacid is obtained from a renewable starting material according to Standard ASTM D6866.

Preferably, the Cx diamine and the Cy diacid are both obtained from a renewable starting material according to Standard ASTM D6866.

The Cx diamine can be a cycloaliphatic diamine. Reference will be made to that which was described above as cycloaliphatic diamine for the diamine of the (diamine).(Cw diacid) comonomer or unit.

The Cx diamine can be an arylaromatic diamine. Mention may be made, among arylaromatic diamines, of 1,3-xylylenediamine (also known as meta-xylylenediamine or MXDA), 1,4-xylylenediamine (also known as para-xylylenediamine or PXDA) and their mixtures.

Advantageously, the Cx diamine is an aliphatic diamine of formula $H_2N—(CH_2)_x—NH_2$ and the Cy diacid is an aliphatic diacid of formula $HOOC—(CH_2)_{y-2}—COOH$, respectively.

Preferably, the Cx diamine is chosen from butanediamine (x=4), pentanediamine (x=5), hexanediamine (x=6), heptanediamine (x=7), nonanediamine (x=9), decanediamine (x=10), undecanediamine (x=11), dodecanediamine (x=12), tridecanediamine (x=13), tetradecanediamine (x=14), hexadecanediamine (x=16), octadecanediamine (x=18), octadecenediamine (x=18), eicosanediamine (x=20), docosanediamine (x=22) and the diamines obtained from fatty acids (x=36).

For the preferred choice of the Cy diacid of the (Cx diamine).(Cy diacid) comonomer or unit, reference will be made to that which was described above as preferred diacid for the Cw diacid of the (diamine).(Cw diacid) comonomer or unit.

Thus, the choice is more preferably made of the diamines for which x=4, 5, 6, 7, 9, 10, 11, 12, 13, 14, 16, 18, 20, 22 and 36 and the diacids for which y=4, 6, 7, 9, 10, 11, 12, 13, 14, 16, 18, 20 and 22 and the dimer fatty acids for which y=36.

Among all the possible combinations for the (Cx diamine).(Cy diacid)/(diamine).(Cw diacid) copolyamides according to the second alternative form of the invention, the choice will in particular be made of the copolyamides corresponding to one of the formulae chosen from 6.10/B.10, 6.10/B.12, 6.10/B.14, 6.10/B.18, 10.10/B.10, 10.10/B.12, 10.10/B.14, 10.10/B.18, 10.12/B.10, 10.12/B.12, 10.12/B.14, 10.12/B.18, 6.10/P.10, 6.10/P.12, 6.10/P.14, 6.10/P.18, 10.10/P.10, 10.10/P.12, 10.10/P.14, 10.10/P.18, 10.12/P.10, 10.12/P.12, 10.12/P.14 and 10.12/P.18, preferably 6.10/B.10, 10.10/B.10, 10.12/B.10, 6.10/P.10, 10.10/P.10 and 10.12/P.10.

The molar proportions of (Cx diamine) and of (Cy diacid) are preferably stoichiometric.

According to a third alternative form of the invention, the (co)monomer or unit A in the general formula A/(diamine).(Cw diacid) is obtained from a lactam.

Mention may in particular be made, among lactams, of caprolactam, oenantholactam and lauryllactam.

Preferably, such a lactam would be obtained from a renewable starting material, still according to Standard ASTM D6866.

However, currently, apart from lactam 11, there exists no lactam which is obtained from a renewable starting material according to Standard ASTM D6866. However, as it is not ruled out that such lactams obtained from a renewable starting material might be manufactured in future years, it is clearly evident that this third alternative form also comes within the subject-matter of the present patent application.

As indicated above for the first alternative form of the invention in which A is obtained from an amino acid, it is possible to envisage the mixture of two or more lactams, it also being possible for this lactam or these lactams to be as a mixture with at least one amino acid and/or at least one diacid and one diamine.

According to a second aspect of the invention, the copolyamide additionally comprises at least one third unit which is represented below as "(Ct diamine).(Cu diacid)" following the general formula of the invention described above according to a first aspect. In the case where it comprises at least three units, the copolyamide of the invention thus corresponds to (that is to say that it comprises at least) the following general formula:

A/(diamine).(Cw diacid)/(Ct diamine).(Cu diacid)

in which t represents the number of carbon atoms of the diamine and u represents the number of carbon atoms of the diacid, t and u each being between 4 and 36.

In the present description of the formula of the first aspect as of the second aspect of the invention, the term "at least" means that the copolyamide according to the invention comprises the formula which has been made explicit, respectively having 2 and having 3 units comprising the first 2 units, but this formula of 2 units or of 3 units can be included in a formula of a copolyamide additionally comprising yet other different units. A copolyamide according to the invention can thus exhibit 4, 5, or 6 etc. different units, provided that they comprise at least the 2 A/(diamine).(Cw diacid) units or the 3 A/(diamine).(Cw diacid)/(Ct diamine).(Cu diacid) units.

According to the invention, at least one of the monomers chosen from A, the Cw diacid, the Ct diamine and the Cu diacid is obtained, in all or part, from renewable or bioresourced starting materials according to Standard ASTM D6866, so that the % $C_{renew.org}$ content, determined by the equation (I) set out above, is strictly greater than 0.

In other words, in the copolyamides according to the invention, at least one of the (co)monomers which are:

- either the amino acid, the Cw and Cu diacids, and the Ct diamine,
- or the lactam, the Cw and Cu diacids, and the Ct diamine,
- or the Cx and Ct diamines, and also the Cy, Cw and Cu diacids, is obtained from a renewable starting material according to Standard ASTM D6866.

The (co)monomer A, in all its alternative forms (lactam, amino acid or (Cx diamine).(Cy diacid)), the cycloaliphatic diamine, the Ct diamine and the Cw and Cu diacids are monomers i, j and k within the meaning of the equation (I).

In an advantageous version of the invention, the molar contents are as follows:

- the molar content of A is between 20 and 82% and advantageously between 22 and 64%,
- the sum of the molar contents of cycloaliphatic diamine and of Ct diamine is between 9 and 40% and advantageously between 18 and 39%,
- the sum of the molar contents of Cw and Cu diacids is between 9 and 40% and advantageously between 18 and 39%.

In the formula A/(diamine).(Cw diacid)/(Ct diamine).(Cu diacid) of the copolyamide according to the second aspect of the invention, reference will be made to that which was described above for the A (co)monomers or units, on the one hand, and the (diamine).(Cw diacid) (co)monomers or units, on the other hand.

In this same formula, the (Ct diamine) denotes a diamine in which t indicates the total number of carbon atoms present in the diamine, t being, of course, an integer strictly greater than 0.

Likewise, the (Cu diacid) denotes a diacid in which u indicates the total number of carbon atoms present in the diacid, u being, of course, an integer strictly greater than 2.

The number of carbon atoms t in the diamine and the number of carbon atoms u of the diacid in the (Ct diamine).(Cu diacid) comonomer or unit of the copolyamide according to the invention are preferably each between 4 and 36.

Preferably, the Cu diacid is obtained from a renewable starting material according to Standard ASTM D6866.

The Cu diacid can be an aliphatic, cycloaliphatic or aromatic diacid. Advantageously, the Cu diacid is an aliphatic diacid of formula HOOC—$(CH_2)_{u-2}$—COOH.

For the preferred choice of the Cu diacid of the (Ct diamine).(Cu diacid) comonomer or unit, reference will be made to that which was described above as preferred diacid for the Cy diacid of the (Cx diamine).(Cy diacid) comonomer or unit or also for the Cw diacid of the (diamine).(Cw diacid) comonomer or unit.

In an advantageous version of the invention, the Ct diamine is obtained from a renewable starting material according to the Standard ASTM D6866.

Likewise, as indicated above for the Cx diamine, the Ct diamine can be an aliphatic, cycloaliphatic or arylaromatic diamine.

The specific cases for which the (Cx diamine).(Cy diacid), (diamine).(Cw diacid) and (Ct diamine).(Cu diacid) comonomers or units are strictly identical in pairs are very clearly excluded.

In particular, according to a fourth alternative form, the (Ct diamine) denotes an aliphatic diamine of formula $H_2N$—$(CH_2)_t$—$NH_2$ in which t indicates the number of carbon atoms present in the diamine, t being, of course, an integer strictly greater than 0.

For the preferred choice of the Ct aliphatic diamine of the (Ct diamine).(Cu diacid) comonomer or unit, reference will be made to that which was described above as preferred diamine for the Cx diamine of the (Cx diamine).(Cy diacid) comonomer or unit.

For the preferred choice of the Ct diamine and of the Cu diacid of the (Ct diamine).(Cu diacid) comonomer or unit, in particular when they are both obtained from a renewable starting material according to Standard ASTM D6866, reference will be made to that which was described above for the preferred diamines and diacids of the (Cx diamine).(Cy diacid) comonomer or unit.

The specific cases for which the (Cx diamine).(Cy diacid) and (Ct diamine).(Cu diacid) comonomers or units are strictly identical are very clearly excluded.

Among all the possible combinations for the A/(diamine).(Cw diacid)/(Ct diamine).(Cu diacid) copolyamides according to the fourth alternative form, the selection will in particular be made of the copolyamides corresponding to one of the formulae chosen from 11/B.10/6.10, 11/P.10/6.10, 11/B.10/10.10, 11/P.10/10.10, 6.10/B.10/10.10, 6.10/P.10/10.10, 6.10/B.12/10.10, 6.10/P.12/10.10, 6.10/B.12/10.12 6.10/P.12/10.12, 6.12/B.12/10.12 and 6.12/P.12/10.12, preferably 6.12/B.12/10.12, 6.12/P.12/10.12, 11/B.10/10.10 and 11/P.10/10.10.

According to a fifth advantageous alternative form, the (Ct diamine) denotes a cycloaliphatic diamine, such as that described above for the (diamine) in the formula A/(diamine).(Cw diacid).

More preferably, the Ct cycloaliphatic diamine is preferably chosen from bis(3,5-dialkyl-4-aminocyclohexyl)methane, bis(3,5-dialkyl-4-aminocyclohexyl)-ethane, bis(3,5-dialkyl-4-aminocyclohexyl)propane, bis(3,5-dialkyl-4-aminocyclohexyl)butane, bis(3-methyl-4-aminocyclohexyl) methane (BMACM or MACM), p-bis(aminocyclohexyl) methane (PACM) and isopropylidenedi(cyclo-hexylamine) (PACP).

More preferably still, the choice will be made of BMACM and also of PACM comprising of the order of 20% by weight of the trans/trans stereoisomer.

As indicated above, the specific cases for which the (diamine).(Cw diacid) and (Ct diamine).(Cu diacid) comonomers or units are strictly identical are excluded.

Among the possible combinations for the A/(diamine).(Cw diacid)/(Ct diamine).(Cu diacid) copolyamides according to the fifth alternative form, the selection will in particular be made of the copolyamides corresponding to one of the formulae chosen from 11/B.10/P.10, 11/B.12/P.12, 11/B.14/P.14, 12/B.10/P.10, 12/B.12/P.12, 12/B.14/P.14, 6.10/B.10/P.10, 6.10/B.12/P.12, 10.10/B.10/P.10, 10.10/B.12/P.12, 10.12/P.10/B.10 and 10.12/P.12/B.12, preferably 11/B.10/P.10 and 11/B.12/P.12.

The molar proportions of (Ct diamine) and of (Cu diacid) are preferably stoichiometric.

The invention also relates to a composition comprising at least one copolyamide according to the first and second aspects of the invention, with the comonomer or unit A being chosen from a unit obtained from an amino acid or from a lactam and a unit corresponding to the formula (Cx diamine).(Cy diacid).

A composition in accordance with the invention can additionally comprise at least one second polymer.

Advantageously, this second polymer can be chosen from a semicrystalline polyamide, an amorphous polyamide, a semicrystalline copolyamide, an amorphous copolyamide, a polyetheramide, a polyesteramide and their blends.

Preferably, this second polymer is obtained, in all or part, from a renewable starting material according to Standard ASTM D6866.

This second polymer can in particular be chosen from polylactic acid (PLA), polyglycolic acid (PGA), polyhydroxyalkanoates (PHA) and polysaccharides, it being possible for the latter to be modified and/or formulated.

The composition according to the invention can also additionally comprise at least one additive.

This additive can be chosen in particular from fillers, fibres, dyes, stabilizers, in particular UV stabilizers, plasticizers, impact modifiers, surface-active agents, pigments, brighteners, antioxidants, natural waxes and their mixtures.

Mention may in particular be made, among the fillers, of silica, carbon black, carbon nanotubes, expanded graphite, titanium oxide or glass beads.

Preferably, this additive will be of renewable origin, still according to Standard ASTM D6866.

While, with the exception of N-heptyl-11-aminoundecanoic acid, the dimer fatty acids and the cycloaliphatic diamines, the comonomers or starting materials envisaged in the present description (amino acids, diamines, diacids) are effectively linear, nothing forbids it from being envisaged for them to be able, in all or part, to be branched, cycloaliphatic, partially unsaturated, aromatic or arylaromatic.

It should be noted in particular that the $C_{18}$ dicarboxylic acid can be octadecanedioic acid, which is saturated, or else octadecenedioic acid, which for its part exhibits an unsaturation.

The copolyamide according to the invention or also the composition according to the invention can be used to constitute a structure.

This structure can be monolayer, when it is formed only from the copolyamide or only from the composition according to the invention.

This structure can also be a multilayer structure, when it comprises at least two layers and when one at least of the different layers forming the structure is formed from the copolyamide or from the composition according to the invention.

The structure, whether monolayer or multilayer, can be provided in particular in the form of fibres, of a film, of a pipe, of a hollow body or of an injected component.

The copolyamide according to the invention or also the composition according to the invention can advantageously be used in the manufacture of lenses, in particular optical lenses, of spectacle lenses or of spectacle frames.

The use of the copolyamide or of the composition according to the invention can also be envisaged for all or part of components of electrical and electronic goods, such as telephones, computers or multimedia systems.

The copolyamides and compositions of the invention can be manufactured according to the usual processes described in the prior art. Reference will in particular be made to the document DE 4318047 or U.S. Pat. No. 6,143,862.

The process for the preparation of a copolyamide according to the invention corresponding to the formula A/(diamine).(Cw diacid) comprises at least one stage of polycondensation of all or part of the (co)monomers chosen from A, a cycloaliphatic diamine and a Cw diacid, it being noted that at least one of the (co)monomers chosen from A and the Cw diacid is obtained, in all or part, from renewable or bioresourced starting materials according to Standard ASTM D6866.

The process for the preparation of a copolyamide according to the invention corresponding to the formula A/(diamine).(Cw diacid)/(Ct diamine).(Cu diacid), comprises at least one stage of polycondensation of all or part of the (co)monomers chosen from A, a cycloaliphatic diamine, a Ct diamine and Cw and Cu diacids, it being noted that at least one of the (co)monomers chosen from A, the Cw diacid, the Ct diamine and the Cu diacid is obtained, in all or part, from renewable starting materials according to Standard ASTM D6866.

The processes for the preparation of the copolyamides comprising two or three distinct units as mentioned above can very clearly be adapted to the processes for the preparation of copolyamides which would comprise more than 3 distinct units.

All these processes additionally comprise at least one stage in which at least one of the (co)monomers chosen from A, the Cw diacid and, if appropriate, the Ct diamine and the Cu diacid, is obtained, in all or part, from renewable starting materials according to Standard ASTM D6866, this stage of obtaining (co)monomer being prior to the polycondensation stage proper.

The present invention will now be described in the following examples, such examples being given with a solely illustrative aim and very clearly without implied limitation.

BRIEF DESCRIPTION OF THE DRAWINGS

FIG. 1 represents a summary of the materials employed in, and results measured in examples.

Preparation of Various Copolyamides (Trials A to S)

The monomers used in all or part in trials A to S are as follows:

- 11-aminoundecanoic acid (denoted A11 in Table 1) supplied by Arkema, CAS 2432-99-7,
- bis(3-methyl-4-aminocyclohexyl)methane (denoted MACM in Table 1), sold under the name Laromin® C260 by BASF, CAS 6864-37-5,
- p-bis(aminocyclohexyl)methane (denoted PACM20 in Table 1), comprising 21% by weight of trans/trans isomers, sold under the name Amicure® by Air Products, CAS 1761-71-3,
- p-bis(aminocyclohexyl)methane (denoted PACM50 in Table 1), comprising 50% by weight of trans/trans isomers, sold by Fluka, CAS 1761-71-3,
- dodecanedioic acid (denoted DC12 in Table 1), sold by Invista, CAS 693-23-2,
- sebacic acid (denotes DC10 in Table 1), sold by Sun Chemie, CAS 111-20-6,
- decanediamine (denoted DA10 in Table 1), sold by Sun Chemie, CAS 646-25-3,
- hexamethylenediamine or hexanediamine (denoted HDMA in Table 1), sold by Rhodia, CAS 124-09-4,
- meta-xylylenediamine (denoted MXDA in Table 1), sold by Mitsubishi Gas Chemical, CAS 1477-55-0,
- lauryllactam, sold by Arkema, CAS 947-04-6.

Various homopolyamides and copolyamides were prepared from 2, 3 or 4 monomers as a mixture with several additives, according to the specific compositions (Examples A to S) given in Table 1.

The preparation process, which can be adapted for all of Examples A to S, will now be described in detail for Example A.

It is specified that the contents by weight of additives indicated below are applicable for all Examples A to S.

The composition of Example A comprises the following monomers and additives (benzoic acid, hypophosphorous acid, Irganox® 1098, which is an antioxidant sold by Ciba, demineralized water), in the following contents by weight:

- 7.35 kg of aminoundecanoic acid (36.51 mol)
- 12.3 kg of decanedioic acid (60.82 mol)
- 14.58 kg of MACM (61.16 mol)
- 72.17 g of benzoic acid (0.59 mol)
- 35 g of Irganox® 1098
- 8.75 g of hypophosphorous acid ($H_3PO_2$)
- 525 g of distilled water This composition is introduced into a 92 l autoclave reactor which, once closed, is heated with stirring to 260° C. After a phase of maintaining under autogenous pressure for 2 hours, the pressure is then reduced to atmospheric pressure over 1.5 h. The reactor is then degassed for approximately 1 h at 280° C. by flushing with nitrogen.

The homopolyamide or copolyamide obtained is then extruded in the form of laces, cooled in a water bath at ambient temperature and then granulated.

The granules obtained are subsequently dried at 80° C. for 12 h under vacuum, in order to achieve a moisture content of less than 0.1%.

Evaluation of the homopolyamides and copolyamides of Examples A to S

The glass transition temperatures (denoted Tg), and also the enthalpies of fusion (in J/g) were measured during the second heating by DSC according to Standard ISO 11357 with heating and cooling rates at 20° C./min.

The measurements obtained have been given in Table 1, thus representing the % $C_{renew.org}$ content calculated for each of the homopolyamides or copolyamides of Examples A to S.

The copolyamides of Examples A to E and H to S are in accordance with the invention, in the sense that the % $C_{renew.org}$ content is indeed strictly greater than 0.

In addition, Examples A to C, H to L and O to S are furthermore transparent.

Moreover, it is noted that the glass transition temperatures can vary, in Examples A to E and H to S in accordance with the invention, between 50° C. and 134° C., which allows a person skilled in the art to adjust the formulation of the compositions according to the desired Tg, if the latter criterion is regarded as important.

This comment is very clearly also valid for the compositions according to Examples A to C, H to L and O to S, which are in accordance with the invention and moreover transparent and which have Tg values varying between 60° C. and 134° C.

Generally, Tg values of greater than or equal to 110° C. make it possible to envisage applications, for the items obtained from the copolyamides and compositions according to the invention, for which the thermomechanical strength at high temperatures, for example from 60° C., is advantageous.

Comparison of the Colours Between Formulations of Copolyamides According to the Invention (Examples T to V):

Composition of the copolyamides of Examples T to V:

EXAMPLE T 8.05 kg of lauryllactam (40.80 mol)
12.37 kg of decanedioic acid (61.16 mol)
14.58 kg of BMACM (61.16 mol)
72.17 g of benzoic acid (0.59 mol)
35 g of Irganox 1098
3.5 kg of distilled water

EXAMPLE U 3.56 kg of decanediamine (20.66 mol)
16.69 kg of decanedioic acid (82.53 mol)
14.75 kg of BMACM (61.88 mol)
72.17 g of benzoic acid (0.59 mol)
35 g of Irganox 1098
525 g of distilled water

EXAMPLE V 8.16 kg of aminoundecanoic acid (40.51 mol)
12.32 kg of decanedioic acid (60.92 mol)
14.52 kg of BMACM (60.92 mol)
72.17 g of benzoic acid (0.59 mol)
35 g of Irganox 1098
525 g of distilled water Examples U and V are manufactured according to the general process described above for Example A, with the preceding compositions U and V.

The process used in the case of Example T is as follows:

A 92 l autoclave reactor is filled with 8.05 kg of lauryllactam (40.80 mol), 12.37 kg of decanedioic acid (61.16 mol), 14.58 kg of BMACM (61.16 mol), 72.17 g of benzoic acid (0.59 mol), 35 g of Irganox 1098 and 3.5 kg of distilled water. The autoclave is then closed and heated with stirring to 280° C. After a phase of maintaining under autogenous pressure for 3 h, the pressure is reduced to atmospheric pressure over 1.5 h and then the reactor is degassed for approximately 1 h at 280° C. by flushing with nitrogen.

The following copolyamides, respectively corresponding to Examples T, U and V according to the invention, are obtained:

PA10.10/B.10 (comprising 54% of renewable organic C)

PA12/B.10 (30% of renewable organic C)

PA11/B.10 (54% of renewable organic C)

The YI (yellow index) was measured according to Standard ASTM E313 on plaques with a thickness of 2 mm. It is represented in the following Table 2.

TABLE 2

| Example | Formulation | (B.10) mol % | YI (ASTM E313) |
|---|---|---|---|
| T | 12/B.10 | 75 | 1.72 |
| U | 10.10/B.10 | 75 | 1.18 |
| V | 11/B.10 | 75 | 0.33 |

Graded from the yellowest to the least yellow, the following are found: 12/B.10>10.10/B.10>11/B.10

Conclusion: Of Examples T to V, it is PA11/B.10 which exhibits the lowest yellow index.

Measurement of the Resistance to Stress Cracking in Ethanol:

In order to determine the resistance to stress cracking, injection moulded IFC test specimens are subjected to various strains (up to 2.99%) and immersed according to Standard ISO 22088 in ethanol at ambient temperature for 24 h. The strain shown in the following Table 3 corresponds to that for which breakage of the test specimen occurs. This measurement reflects in particular the ability of the polyamide to withstand surface treatments (cleaning wipes, solvents comprising ethanol).

TABLE 3

| Supplier | Formulation | Composition | % strain |
|---|---|---|---|
| Arkema | 12/B.I/B.T | 30/20/50 molar % | 0.50 |
| EMS | B.12 | 50.50 molar % | 0.99 |
| Arkema | B.14 | 50.50 molar % | 2.99 |
| Arkema | 11/B.10 | 23/77 molar % (Example A) | No breaking |

Under these strain conditions, it is noticed that PA11/B.10 does not break. The resistance to stress cracking of PA11/B.10 (Example A according to the invention) is better than that of the homopolyamides PAB.14 and PAB.12 (comparative examples) in ethanol.

Measurement of the Refractive Index (N) of these Same Test Specimens:

The device used is an Abbe refractometer from Krüss. Bromonaphthalene is used between the prism and the sample in order to make possible good contact between the prism and the test specimen to be studied.

B.14→n=1.507

B.12→n=1.510

11/B.10→n=1.511

PA11/B.10 exhibits a refractive index equivalent to that of B.12 and greater than that of PAB.14.

For applications of optical lens and spectacle lens type, the use of PA11/B.10 according to the invention is thus clearly advantageous: in addition to being transparent, PA11/B.10 exhibits a refractive index of 1.511; a very low yellow index and an excellent resistance to stress cracking in ethanol.

With the exception of the cycloaliphatic diamines and the lactams, the amino acids, diamines and diacids mentioned in the present patent application are currently known as being able to result from renewable starting materials within the meaning of Standard ASTM D6866.

Of course, the present patent application is also intended to cover the copolyamides which may be obtained from amino acids, lactams, diamines and/or diacids, in particular cycloaliphatic diamines, for which synthesis routes will be developed in the future starting from renewable (bioresourced) starting materials according to the said Standard ASTM D6866.

Furthermore, copolyamides comprising two or three distinct units have been explicitly described. However, nothing forbids the envisaging of copolyamides comprising more than three distinct units, for example four or five distinct units, each of these multiple units being obtained either from an amino acid or from a lactam or corresponding to the formula (diamine).(diacid), the different units being strictly distinct in pairs and with the proviso that the % $C_{renew.org}$ content, determined by the equation (I) set out above, is strictly greater than 0.

The invention claimed is:

1. A composition consisting of (1) a transparent copolyamide consisting of two units and having the formula:

A/(diamine).(Cw diacid), in which:

the diamine is a cycloaliphatic diamine, that is bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl) butane, bis(3-methyl-4-aminocyclohexyl)methane (MACM), p-bis(aminocyclohexyl)methane (PACM) or isopropylidenedi(cyclohexylamine) (PACP), Cw diacid is succinic acid (w=4), adipic acid (w=6), heptanedioic acid (w=7), azelaic acid (w=9), sebacic acid (w=10), undecanedioic acid (w=11), dodecanedioic acid (w=12), brassylic acid (w=13), tetradecanedioic acid (w=14), hexadecanedioic acid (w=16), octadecanedioic acid (w=18), octadecenedioic acid (w=18), eicosanedioic acid (w=20), docosanedioic acid (w=22) or dimer fatty acids having 36 carbons and A is a unit obtained from N-heptyl-11-aminoundecanoic acid and in which A or the Cw diacid are obtained, in all or part, from renewable starting materials according to Standard ASTM D6866 in order for the content, expressed as percentage, of renewable organic carbon in the copolyamide, denoted % $C_{renew.org}$, to be greater than or equal to 20%, the content %$C_{renew.org}$ corresponding to the following equation (I):

$$\% C_{renew.org} = \frac{\sum_i Fi \times Ci + \sum_k Fk \times Ck'}{\left(\sum_j Fj \times Cj + \sum_i Fi \times Ci + \sum_k Fk \times Ck\right)} \times 100 \tag{I}$$

with i =monomer(s) resulting from 100% renewable starting materials, within the meaning of Standard ASTM D6866 j =monomer(s) resulting from 100% fossil starting materials, within the meaning of Standard ASTM D6866 k =monomer(s) resulting in part from renewable starting materials, within the meaning of Standard ASTM D6866

Fi, Fj, Fk =respective molar fraction(s) of the monomers i, j and k in the copolyamide Ci, Cj, Ck =respective number of carbon atoms of the monomers i, j and k in the copolyamide, Ck' =number of atoms of renewable organic carbon, within the meaning of Standard ASTM D6866, in the monomer(s) k, wherein the molar content of A is between 20 and 82%, and the molar contents of cycloaliphatic diamine and of Cw diacid are each between 9 and 40%, (2) optionally a second polymer that is PLA, PGA, PHA or a polysaccharide, and (3) optionally additives that are fillers, fibers, dyes, stabilizers, plasticizers, impact modifiers, "surfactants, pigments, brighteners, antioxidants, or waxes, wherein said transparent copolyamide exhibits an enthalpy of fusion of between 0 and 23 J/g".

2. The copolyamide according to claim 1 is of the formula 11/B.10, 11/P.10, 11/B.12, 11/P.12, 11/B.14, 11/P.14, 11/B.18 or 11/P.18 wherein 11 is N-heptyl-11-aminoundecanoic acid.

3. The composition according to claim 1, wherein at least one second polymer (2) is present.

4. The composition according to claim 1, wherein the second polymer is obtained, in all or part, from a renewable starting material according to Standard ASTM D6866.

5. The composition according to claim 1, additionally comprising at least one additive of natural and renewable origin according to Standard ASTM D6866, that is fillers, fibres, dyes, stabilizers, plasticizers, impact modifiers, surfactants, pigments, brighteners, antioxidants, natural waxes or their mixtures.

6. In a monolayer structure, or a multilayer structure, the improvement wherein the mono layer structure or at least one layer of the multilayer structure comprises a composition according to claim 1.

7. A mono- or multilayer structure according to claim 6, wherein the structure is provided in the form of fibres, of a film, of a pipe, of a hollow body or of an injected component.

8. Lenses, spectacle lenses or spectacle frames, comprising in said lenses or frames a copolymer according to claim 1.

* * * * *